United States Patent [19]

Engman et al.

[11] 3,900,933
[45] Aug. 26, 1975

[54] CLAMP DEVICE

[75] Inventors: Milton C. Engman; Stanley J. Siberell, both of Des Moines, Iowa

[73] Assignee: Emco Industries, Inc., Des Moines, Iowa

[22] Filed: Nov. 8, 1973

[21] Appl. No.: 413,924

[52] U.S. Cl............................... 24/277; 138/99
[51] Int. Cl.² ............................. B65D 63/00
[58] Field of Search...................... 138/99; 24/277

[56] References Cited
UNITED STATES PATENTS

| | | | |
|---|---|---|---|
| 1,270,960 | 7/1918 | Linton | 24/277 |
| 1,413,818 | 4/1922 | Wilkinson | 24/277 |
| 2,993,255 | 7/1961 | Jagiel | 24/277 |
| 3,040,407 | 6/1962 | Brown | 24/277 |

*Primary Examiner*—Paul R. Gilliam
*Assistant Examiner*—D. L. Troutman
*Attorney, Agent, or Firm*—Zarley, McKee, Thomte & Voorhees

[57] ABSTRACT

A clamp device for clamping first and second telescopically mounted tubes comprising a preformed bolt clamp and a saddle element. The preformed bolt clamp is of unitary and substantially rigid material and has a center portion and opposite end portions. The center portion extends completely around the outer surface of the outer tube with the end portions thereof extending outwardly from the outer tube in substantially the same direction. The saddle element embraces a part of the center portion of the bolt clamp and has openings formed therein to receive the end portions of the bolt clamp. The saddle element is comprised of a stiff and rigid material having some resiliency. Fastening and tightening means comprising nuts are mounted on the end portions of the bolt clamp and are tightened to draw the saddle element into tight, intimate and continuous engagement with the adjacent part of the center portion of the bolt clamp and to draw the center portion of the bolt clamp into tight, intimate and continuous engagement with the outer surface of the outer tube element. The method of securing first and second telescopically mounted tubes is also disclosed.

7 Claims, 6 Drawing Figures

PATENTED AUG 26 1975 3,900,933

3,900,933

CLAMP DEVICE

BACKGROUND OF THE INVENTION

Conventional type pipe clamps generally comprise a U-shaped bolt and a saddle element having openings in its opposite ends for receiving the end portions of the U-shaped bolt. The saddle element is ordinarily U-shaped in cross-section so that the walls or legs of the saddle element bear against a portion of the pipe or tube. The conventional clamps do not uniformly compress the pipe around the circumference thereof but ordinarily exert greater pressure at the center of the bolt and the center of the saddle element. Likewise, the conventional clamps do not create a uniform deformity in the pipe which results in some exhaust leadkage occurring.

As previously stated, the conventional clamp devices permit some exhaust leakage and the leakage greatly affects the atmosphere by polluting the same. This is especially true in the newer exhaust systems which include catalytic converters.

Therefore, it is a principal object of the invention to provide an improved clamp device.

A further object of this invention is to provide a clamp device for clamping first and second telescopically mounted tubes.

A further object of this invention is to provide a clamp device which uniformly compresses the tubes around the circumference thereof.

A further object of the invention is to provide a clamp device comprising a preformed bolt which has a center portion extending completely around the outer surface of the outer tube element.

A further object of this invention is to provide a clamp device comprising a saddle element which is slightly flexible or resilient.

A further object of this invention is to provide a clamp device comprising a preformed bolt clamp and a saddle element with the saddle element engaging a part of the center portion of the bolt clamp.

A further object of the invention is to provide a clamp device which is economical of manufacture, durable in use and refined in appearance.

These and other objects will be apparent to those skilled in the art.

BRIEF DESCRIPTION OF THE DRAWINGS

This invention consists in the construction, arrangements and combination of the various parts of the device, whereby the objects contemplated are attaned as hereinafter more fully set forth, specifically pointed out in the claims, and illustrated in the accompanying drawings, in which:

DESCRIPTION OF THE PREFERRED EMBODIMENT

Figure 1:
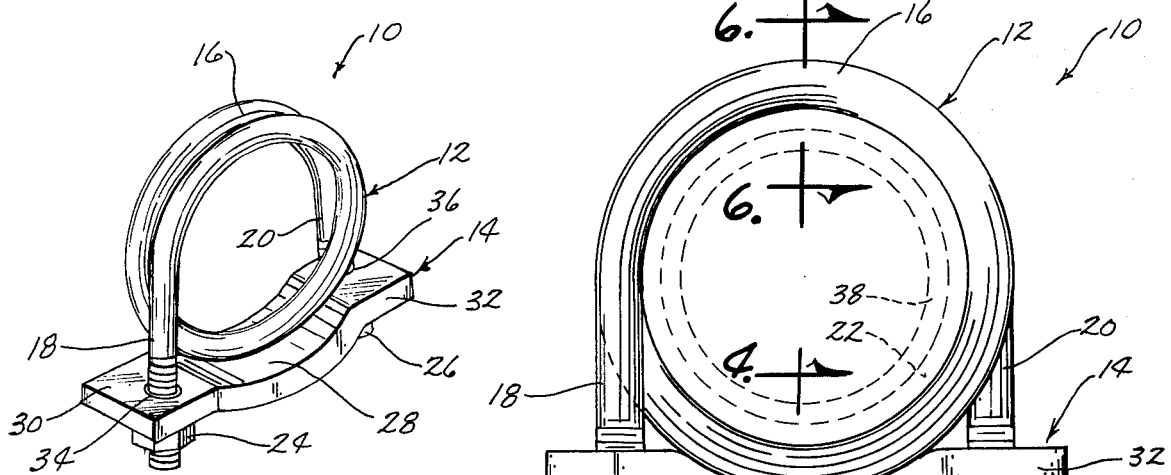
FIG. 1 is a perspective view of the clamp device of this invention.

The clamp device of this invention is referred to generally by the reference numeral 10 and generally comprises a preformed bolt clamp 12 and a saddle element 14. Bolt clamp 12 is comprises of a unitary and substantially rigid material, the specifications of which will be described hereinafter. Bolt clamp 12 generally comprises a center portion 16 and opposite end portions 18 and 20. As seen in the drawings, the center portion 16 extends completely around the center portion 16 extends completely around the outer surface of the outer tube element referred to generally by the reference numeral 22. The end portions 18 and 20 extend outwardly from the outer tube element in substantially the same direction. As seen in FIG. 1, end portions 18 and 20 are provided with externally threaded portions for receiving the nuts 24 and 26 respectively.

Figure 2:
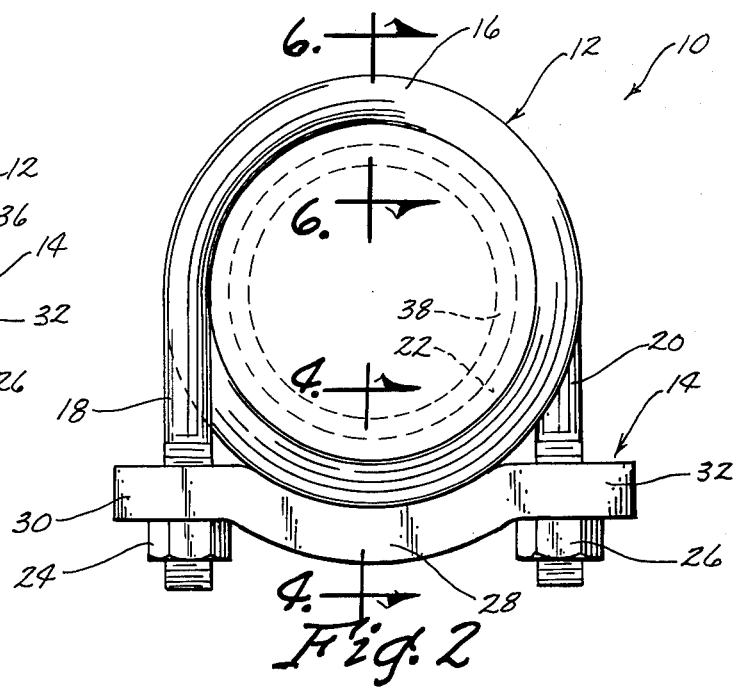
FIG. 2 is an end view of the clamp device.
Figure 3:
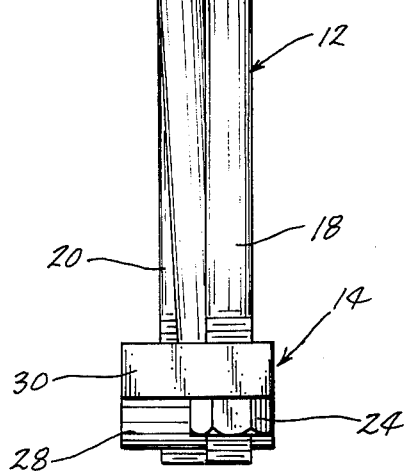
FIG. 3 is a side view of the clamp device.

Saddle element 14 generally comprises an arcuate center portion 28 and opposite end portions 30 and 32. End portions 30 and 32 are provided with openings 34 and 36 respectively adapted to receive the end portions 18 and 20 of the bolt clamp 12. Saddle element 14 is comprised of a hot or cold rolled steel, the specifications of which will also be described in more detail hereinafter. As seen in FIG. 2, central portion 28 of saddle element 14 is adapted to embrace a part of the center portion 16 of the bolt clamp 12.

Figure 4:
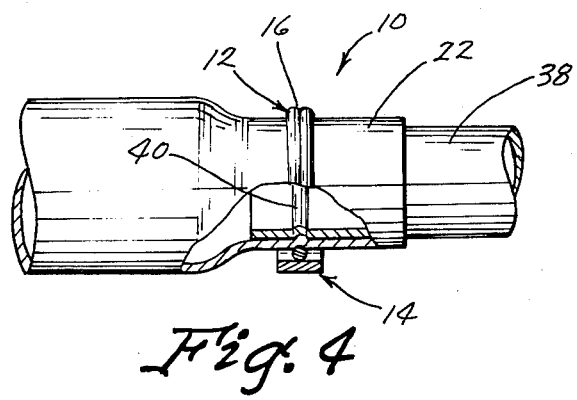
FIG. 4 is a side view of the clamp device being used on a pair of telescopically mounted tubes with a portion thereof cut-away to more fully illustrate the invention.
Figure 6:
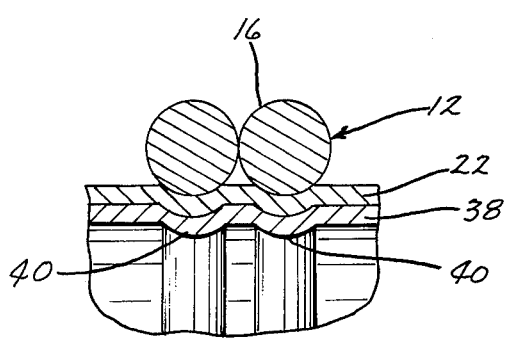
FIG. 6 is a sectional view as seen on lines 6 — 6 of FIG. 2.
Figure 5:
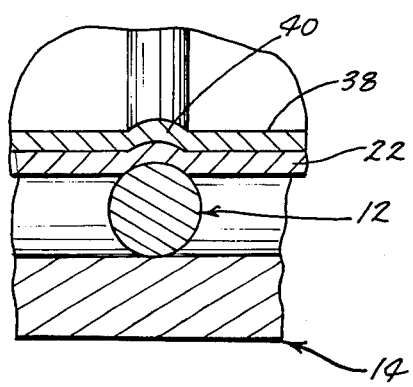
FIG. 5 is a sectional view as seen on lines 5 — 5 of FIG. 2.

The clamp device is used as follows. Prior to the tube 38 being telescopically received within the tube 22, the bolt clamp 12 is slippeed over the open end of the tube 22. The tube 38 is then slidably extended into the tube 22 such as seen in FIG. 4. Saddle element 14 is then mounted on the bolt clamp. Nuts 24 and 26 are then threadably mounted on the end portions 18 and 20 of the bolt clamp and are tightened. The tightening of the nuts 24 and 26 causes the center portion of the bolt clamp to be drawn into tight, intimate and continuous engagement with the outer surface of the tube element 22 and causes the saddle element 14 to be drawn into tight, intimate and continuous engagement with the adjacent part of the center portion of the bolt clamp. The tightening of the nuts 24 and 26 causes the center portion of the bolt clamp to uniformily compress the telescopically mounted tubes around the entire circumference thereof so that the tubes are uniformily deformed such as seen in FIGS. 4 – 6 and generally referred to by the reference numeral 40. The deformation 40 positively prevents exhaust leakage between the telescopically mounted tubes. It is extremely important to note that the clamp device 10 creates a deformity of the pipes in a 360° arc so that the pipes are not deformed into an oval shape such as occurs with conventional clamps. It is also important to note that the saddle element 14 does not bear against the tubes but bears only against the adjacent part of the bolt clamp 12. The saddle element is also slightly flexible or resilient so that it may deform slightly to exert a uniform pressure against the adjacent part of the bolt clamp.

The specfications for the bolt 12 are preferably that it be comprised of 1018 – 1020 steel having a tensile strength of 100,000 P.S.I.. to 120,000 P.S.I. Preferably, the bolt has a ⅜ inch diameter. The saddle element 14 is preferably comprised of hot or cold rolled steel having a thickness of five-sixteenths to one-half inches.

The tensile strength of the saddle element is preferably 50,000 to 70,000 P.S.I.

Thus, it can be seen that the bolt clamp accomplishes at least all of its stated objectives.

We claim:

1. The combination of a clamp device and two telescopically mounted tube elements, comprising a first tube element having at least one open end, a second tube element telescopically mounted in close fitting relationship within the open end of said first tube element, a preformed bolt clamp of unitary and substantially rigid material having a center portion and opposite end portions, said center portion extending completely around the outer surface of said first tube element with said end portions extending outwardly from said first tube element in substantially the same direction, a saddle element embracing a part of the center portion off said bolt clamp, and having openings therein to receive the end portions of said bolt clamp, said saddle element being of stiff and rigid material, fastening and tightening means on the end portions of said bolt clamp and being tightened to draw said saddle element into tight, intimate and continuous engagement with the adjacent part of the center portion of said bolt clamp, and to draw the center portion of said bolt clamp into tight, intimate and continuous engagement with the outer surface of said first tube element, said saddle element having a configuration such that it is spaced from the outer surface of said tube element so that said saddle element bears only against the said adjacent part of the center portion of said bolt clamp, said bolt clamp having a circular cross-section for its entire length.

2. The combination of claim 1 wherein said center portion of said bolt clamp has arcuately deformed at least said first tube element at the area of engagement therewith.

3. The combination of claim 1 wherein said center portion of said bolt clamp has arcuately deformed said first and second tube elements.

4. The combination of claim 1 wherein said saddle is deformed into tight continuous engagement with said bolt clamp.

5. The method of sealing together two telescopically positioned tube elements, comprising, placing the outer portion of a substantially rigid performed unitary bolt clamp completely around the circumference of the outer circumference of the outer of said tube elements, with the ends of said bolt clamp extending outwardly from said tube elements in substantially the same direction, placing a normally rigid saddle having suitable apertures over the ends of said bolt clamp wherein the saddle is free from engagement with said tube elements and wherein the saddle bears only against the center portion of said bolt clamp, and tightening said saddle against the center portion of said bolt clamp to cause said bolt clamp to exert substantially uniform pressure on said tube elements completely around the circumference of said outer tube.

6. The method of claim 5 wherein at least the outer tube element is arcuately deformed by the center portion of said bolt clamp at the area of engagement therewith, 7. The method of claim 5 wherein both of the tube elements are arcuately deformed by the center portion of said bolt clamp.

* * * * *

UNITED STATES PATENT OFFICE
CERTIFICATE OF CORRECTION

Patent No. 3,900,933  Dated August 26, 1975

Inventor(s) Milton C. Engman et al.

It is certified that error appears in the above-identified patent and that said Letters Patent are hereby corrected as shown below:

Column 3, line 34 and Column 4, line 23, delete "only".

Signed and Sealed this ninth Day of December 1975

[SEAL]

Attest:

RUTH C. MASON
*Attesting Officer*

C. MARSHALL DANN
*Commissioner of Patents and Trademarks*